United States Patent [19]

Jacobson et al.

[11] 4,127,322

[45] Nov. 28, 1978

[54] HIGH BRIGHTNESS FULL COLOR IMAGE LIGHT VALVE PROJECTION SYSTEM

[75] Inventors: Alexander D. Jacobson, Topanga; Jan Grinberg, Los Angeles; Donald E. Sprotbery, Huntington Beach; Donald D. Boswell, Granada Hills, all of Calif.

[73] Assignee: Hughes Aircraft Company, Culver City, Calif.

[21] Appl. No.: 637,906

[22] Filed: Dec. 5, 1975

[51] Int. Cl.[2] .................... H01J 29/89; G03B 21/00; G02F 1/01
[52] U.S. Cl. ...................................... 353/31; 350/342; 353/34; 353/37; 353/121; 358/59; 358/61
[58] Field of Search ...................... 353/31, 34, 37, 120, 353/121, 122; 350/160 LC; 178/7.88; 358/56, 59, 61, 62

[56] References Cited

U.S. PATENT DOCUMENTS

| | | | |
|---|---|---|---|
| 2,958,258 | 11/1960 | Kelly | 178/7.88 |
| 3,588,324 | 6/1971 | Marie | 358/61 |
| 3,824,002 | 7/1974 | Beard | 350/160 LC |

*Primary Examiner*—Steven L. Stephan
*Attorney, Agent, or Firm*—Donald C. Keaveney; W. H. MacAllister

[57] ABSTRACT

There is disclosed an electro-optical system for real time projection of very high brightness, full color pictorial images from television or other program sources onto a large display screen from a set of three reflection type AC driven field effect mode birefringent liquid crystal light valves each of which modulates a primary color component video image onto a collimated beam of polarized light of a given primary color by modulating the polarization state thereof. In order to achieve very high brightness without overheating the system it is necessary that none of the optical elements forming the projection beam optical system absorb light in carrying out their function. Hence all projection beam optical processes are non-absorptive to first order. The light valves are devices that receive and reflect projection light from an independent high power light source while modulating onto the reflected light video images derived from a low level light source such as a cathode ray tube. The modulation onto the projection beam is achieved by modulating the state of polarization thereof. One such device is used for the red portion of the video image, a second for the green portion and a third for the blue portion. The optical system derives light from a white projection light source, polarizes it, splits it into the three primary colors, directs the three colored beams to the three light valves respectively for image modulation, collects the light that has been modulated by the light valves, recombines the three beams, and projects them onto the screen with sufficient registration to create full color range for the full color image. The optical system uses only a single projection lens and a single polarizing/analyzing beam splitter/recombiner and suitable dichroic mirrors. There is thus provided a simple, compact low weight, high brightness and high efficiency full color light valve image projection system for the projection of high brightness, full color, real time dynamic or static imagery which may include provision for overlay legends or other information as well as possible sterescopic or three dimensional perception by the viewer.

15 Claims, 7 Drawing Figures

HIGH BRIGHTNESS FULL COLOR IMAGE LIGHT VALVE PROJECTION SYSTEM

BACKGROUND OF THE INVENTION

1. Field of the Invention

The invention relates to an electro-optical system for projecting very high brightness, full color images from television or other program sources through a projection lens onto a display screen.

2. Prior Art

Full color image display systems for projection onto a large screen suitable for group viewing of images from television or similar program sources are desirable in applications such as educational, governmental or business conference viewing, cafe or theater entertainment and the like. The efforts to develop such systems have not heretofore overcome the problem of simultaneously achieving the full brightness, the clarity and the resolution to which theater patrons have become accustomed in viewing motion picture film projection. Presently available theater television projection systems have not been able to achieve this standard in spite of many attempts.

Some of these attempts have involved the use of Schlieren optical systems which provide a dark field projector in the sense that no light reaches the screen in the absence of an image signal. This is achieved by providing a diffraction grating or mesh grid both before and after a modulating surface in an optical light path. In the absence of signal, light is blocked by the mesh grid and is transmitted only when video signal changes an optical property of the modulating surface, such as its local curvature, in order to cause a change in the refraction of light thus permitting it to pass through the second grid. Such systems are inherently limited in the amount of usable light and have limited resolution. One such system is, for example, described in U.S. Pat. No. 3,835,346 to F. Mast. In addition to the above noted problems this system is inherently directed to a black and white or monochromatic imaging system. It does have the merit of recognizing the advantage of using an independent projection light source to overcome the limited light intensity available from systems which attempt a direct projection of a cathode ray tube generated image.

One earlier version of such a Schlieren System is described by E. Labin in an article entitled "The Eidophor Method of Theater Television" at page 393 of the April 1950 issue of the *Journal of the SMPTE*. Another early version of such a system was disclosed by E. Baumann in U.S. Pat. No. 2,892,380 (June 30, 1959). Like Mast, Baumann realizes the need for using an independent projection light source. Baumann modulates this projection light by means which he refers to as a multiple layer control means including a combination of a photoconductive layer with a layer of a substance with electric Kerr effect such that the index of refraction of the latter substance is varied by an electric field resulting from a low level light signal impinging on the photoconductor. The combination of a Schlieren optical system with what appears to be intended to be a liquid crystal material operated in the dynamic scattering mode, however, can not give the image contrast, speed of response, or effective light utilization required for efficient projection system as can be seen from the low effectiveness of present day commercial systems.

Also, Baumann, like Mast, is directed to a monochromatic system. Representative approaches to a color projection system are shown in U.S. Pat. Nos. 2,958,258 to Kelly and 3,893,758 to Hunzinger. Insofar as the Kelly patent relates to a full color system utilizing three primary colors, it is inherently a serial mode subtractive system rather than a parallel mode additive system. This feature alone inherently detracts from its possible efficiency level. Kelly states beginning at line 65 of column 1 that the principle object of his invention is to provide a projection system wherein an independent light source can be arranged off of the axis of a modulating object to avoid the skewing problems he has previously discussed and wherein light from this source can be conducted into and out of a transparent modulator one side of which is inaccessible to this light. To do this he provides a polarization selective light dividing interference coating of the type described in U.S. Pat. Nos. 2,403,731 to MacNeille or 2,449,287 to Flood. The polarized light output from this device is supplied to one or more cathode ray tubes, each with a scotophor layer which subtracts a predetermined portion of the color spectrum. Reference is made to the description of FIG. 3 beginning at line 30 of column 4 of Kelly. Thus, in all of his three color systems, Kelly takes light from a lamp L and transmits it in series through a plurality of polarizing beam splitters, first to a scotophor tube which subtracts one color from the white beam, then to a second scotophor which subtracts a second color modulation pattern from the beam, and then the same light is transmitted to a third scotophor which subtracts the third color from the beam before the final beam is projected onto the screen. The same light goes sequentially to all three scotophor tubes for subtractive modulation thus posing serious problems of image registration and efficiency of light use. In particular, such absorption devices make it difficult to achieve necessary brightness for large scale use without overheating the system. Furthermore, in association with each of his scotophor tubes Kelly places a quarter waveplate and sometimes an additional filter. Each of these components introduces additional possibilities of imperfection in execution of the system.

The Hunzinger U.S. No. 3,893,758 overcomes some of the problems in Kelly by substituting a Wollaston polarizing prism for the MacNeille prism used in Kelly. This change precludes the use of orthogonal optic axes since the Wallaston prism is not polarization selective at a 45° or 90° incidence angle. Furthermore, whereas the MacNeille prism can be of any reasonable area, such as several square inches, since it consists of a deposited multilayer interference filter at the interface of two prisms, the Wollaston polarizing prism is actually composed of the interface between two naturally occurring single crystals which normally occur with an average diameter of approximately 1 centimeter. The result of this limitation is that light from the projection light source must be focused onto the polarizing prism by a curved mirror 123 and is then passed through lenses such as 34 or 35 before being transmitted to the modulating cathode ray tubes 31, 32 and 33. The necessity of focusing light on the polarizer entails the necessity of recollimating it by lenses before it reaches the modulation elements which in turn introduces all of the problems of optical aberration inherent in any non-collimated optical system. Furthermore, the oblique angle critically imposed by the Wollaston prism makes the mechanical design in the projector system difficult to lay out and also imposes stringent alignment requirements. For his modulation device Hunzinger turns to cathode ray tubes of the optical relay type wherein the target is in the form of a plate of $KD_2PO_4$ material (KDP) exhibiting the electro-optical Pockels-effect such that the video image written on the back of the face plate of the tube by the electron beam produces a change in the birefringence of the crystalline material of the plate which modulates polarization of the beam. The quantitative value of the birefringence of such plates, however, is much lower than can be obtained from presently available liquid crystal materials with the results that the KDP crystal plate must be considerably thicker than a layer of liquid crystal in order to achieve the necessary polarization modulation. This thickness in turn requires that high voltages be applied to the plate. Furthermore the plate requires an elaborate cooling system (not shown in Hunzinger's drawing) since it must be operated at $-60°$ C. Such materials are only birefringent when they are held below the Curie point for the material. Such a cooling system requirement renders the system unsuitable for use in any but the most elaborately provided permanent insulations.

Image brightness amplifiers using liquid crystal materials are disclosed, for example, in U.S. Pat. Nos. 3,803,408 to Assouline et al., 3,732,429 to Braunstein et al., and 3,824,002 to Beard. Assouline shows a D.C. light valve whereas Beard shows an alternating current driven light valve. All three use liquid crystal materials operating in the dynamic scattering mode which cannot give the image contrast and speed of response required for the present system application.

An AC field effect mode of operating a birefringent liquid crystal material was reported in an article entitled "Electric-Field-Induced Orientational Deformation of Nematic Liquid Crystals: Tunable Birefringence" in "Applied Physics Letters" volume 20, No. 5, Mar. 1, 1972 beginning at page 199 by F. J. Kahn. Kahn therein described a laboratory display device for exhibiting spatially uniform birefringences tunable over the range of 0.0 to 0.15 for applied voltages less than 20 volts rms and with a sharp threshold below 4 volts rms for thin layers of nematic liquid crystals with negative dielectric anisotropy. The device consisted of a thin film of nematic material sandwiched between two electrodes at least one of which was transparent. An electric field applied along the normal to the sample layer is used to tune the birefringence, the variation of which was observed by sandwiching the package between crossed or parallel polarizers. A somewhat similar liquid crystal display device also incorporating matrix type electrodes for defining numerals is described in U.S. Pat. No. 3,900,248 to Nagasaki.

An image brightness amplifier including a field effect mode birefringent liquid crystal material light valve to obtain spatially modulated birefringence effects in a light valve and single channel projection system is disclosed and claimed in copending U.S. Patent application Ser. No. 538,381, filed Jan. 6, 1975 by W. P. Bleha et al., now abandoned, and assigned to the same assignee as the present application. That application is directed to an AC field effort mode liquid crystal light valve for spatially modulating the polarization of projection light in response to a low level light image as from a cathode ray tube which is of the type suitable for use in the system described herein. That application, however, is directed to use of such a light valve only in system having a single optical channel suitable for monochromatic black and white or color symbology projection. The present application is directed to a full color projection system which may use three such light valves.

SUMMARY OF THE INVENTION

It is an object of the present invention to provide an optical system particularly suited for use with three reflection type polarization modulation means such as the light valves of the type shown in the above noted Bleha et al. application for providing a simple, compact, low weight, high brightness, full color light valve image projection system using only a single beam splitting polarizer and a single projection lens for projecting three superposed primary color modulated images.

It is a further object of the invention to provide such a system for projecting real time full color images which may be moving or still, i.e., which may be dynamic or static images.

It is a further object of this invention to provide such a system which also has provision for projection of overlay symbols or legends in black and white or color also through a single projection lens with nearly 100% projection beam optical efficiency.

It is a still further object of this invention to provide such a projection system which can afford three dimensional perception by the viewer of true stereoscopic information.

These and other objects and advantages are achieved by providing a set of three AC driven field effect mode birefringent liquid crystal light valves of the type described in the above noted Bleha application, one for the red portion of the video image, one for the blue video image and one for the green video image. These light valves are devices that are designed to modulate video images onto a beam of collimated light by means of spatially varying modulation of the direction of polarization of the light. These devices are used in combination with an optical system which derives light from a single projection lamp and uses a single interference layer type of polarization selective beam splitter to polarize the light on a first pass therethrough and to analyze it after reflection from the light valves on a second pass therethrough. After leaving the beam splitter, the polarized light is divided into three beams of appropriate color by dichroic mirrors arranged in such a fashion that each color beam is applied to only one light valve. The color beams are recombined and superposed when they are reflected back to the beam splitter which now serves as an analyzer and passes the modulated images through a single projection lens to the display screen.

BRIEF DESCRIPTION OF THE DRAWINGS

These and other objects, advantages and features will be more fully apparent from the following detailed description taken in connection with the accompanying drawings wherein like reference characters refer to like parts throughout and in which.

DETAILED DESCRIPTION OF THE INVENTION

Figure 1:
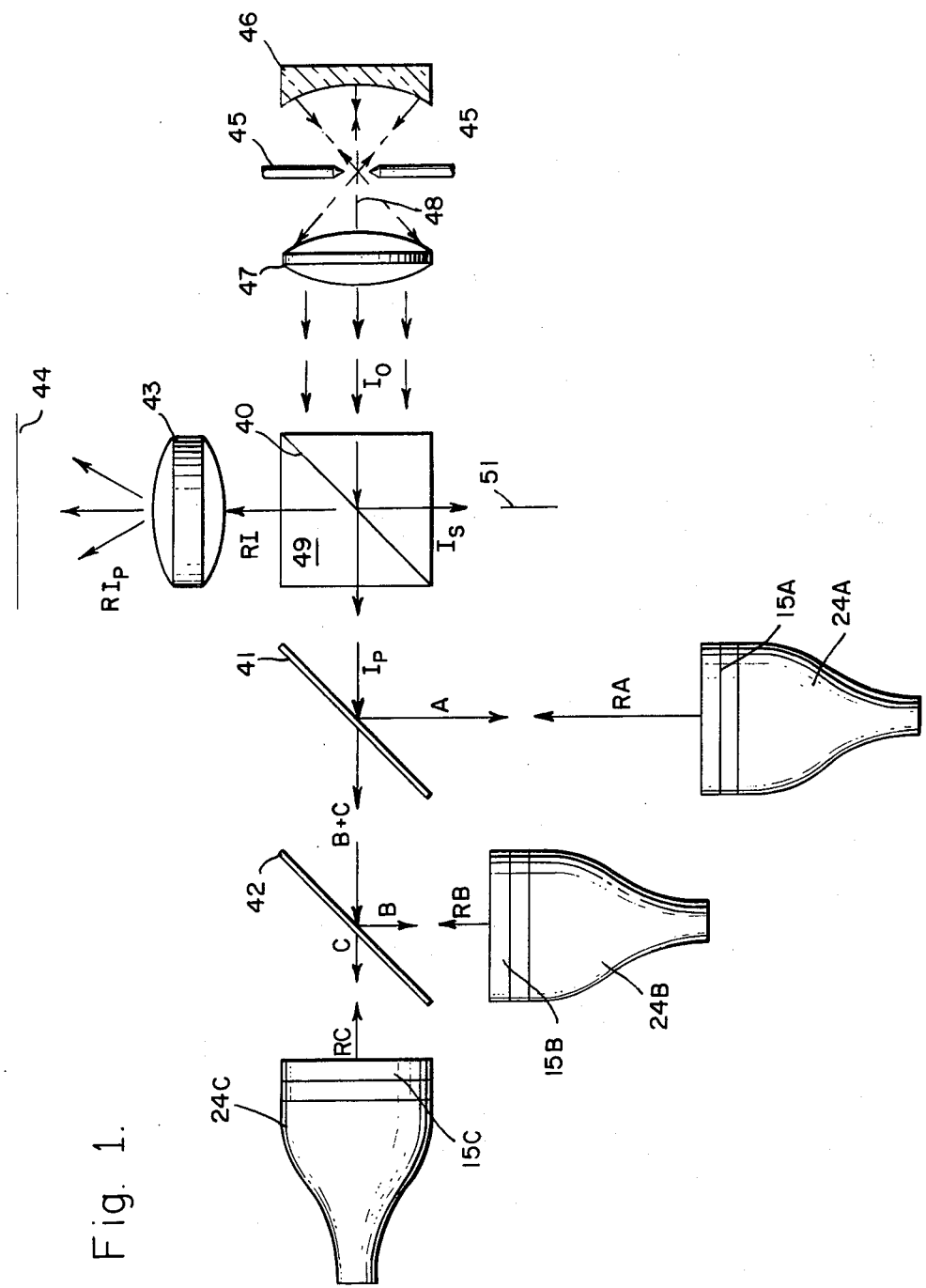
FIG. 1 is an optical schematic plan view illustrating a first embodiment of the three primary color projection system.

Turning now to the drawing there is shown in FIG. 1 a diagrammatic plan view of a basic system which embodies the concepts of the light valve polarization modulated color television projector. The system uses a single polarizing beam splitter 40 both to polarize and to analyze the projection light for all three colors. It uses dichroic mirrors 41 and 42 to separate and then recombine the three color images which are formed by modulating the light at light valves 15A, 15B, and 15C. The reflected individual color images are recombined in the polarizing beam splitter 40 which deflects the full color image in beam $RI_s$ through the single projection lens 43 to screen 44. Beam $RI_s$ is thus the sum of the reflected S polarization state colors $RA+RB+RC$.

The polarizer-analyzer beam splitter-recombiner 40 is preferably a polarization selective, light dividing interference coating or multirefractive layer device of the type described in U.S. Pat. No. 2,403,731 to MacNeille. As disclosed in the MacNeille patent a plurality of refractive layers of appropriate index of refraction and thickness may be deposited at the interface between two halves of a glass cube 49 so that the layer forms a 45° angle with the intersecting sides of the cube. A beam splitter made according to the design disclosed by MacNeille which is designed to be exact for a wavelength of about 550 millimicrons will be highly efficient throughout the visible spectrum. More particularly, in column 4, lines 65-70 MacNeille states that with six interface layers the total reflectance is over 99% for light of one wavelength polarized (in azimuth S) perpendicular to the plane of incidence and if this wavelength is selected in the green as suggested it is over 95% throughohut the visible spectrum. Increasing the number of interfaces can increase these percentages if a particular application so requires. A commercial embodiment of such a beamsplitter suitable for use herein can be obtained from the Perkin Elmer Corp. Electro-Optical Division, Norwalk, Conn. It is identified by Perkin Elmer by their product No. PE800-7381.

In operation, light which originates from a short arc lamp source 45 emitting white unpolarized light $I_O$ containing the entire visible spectrum is reflected from spherical mirror 46 through a condenser lens 47 in a collimated beam to the beam splitter 40. The projection light source comprising the arc lamp 45 and mirror 46 and the center of the polarizing beam splitter 40 define a first optic axes 48 on which condenser and collimating lens 47 is also positioned and along which light $I_O$ from the source 45 is transmitted. This collimated beam of unpolarized white light, $I_O$, enters the glass cube 49 normal to its surface and at 45° to the polarizing beam splitter layer 40. The S polarization state component ($I_S$) is reflected out of the system by the thin polarizing film 40 along a second optic axis 51 which orthogonally intersects the first optic axis 48 substantially at the center of beamsplitter 40. Projection lens 43 is also positioned on optic axis 51 on the opposite side of beam splitter 40. The P polarization state component $I_p$ passes through the cube 49 to the first dichroic mirror 41 which is also positioned on optic axis 48. Polarization states S and P are orthogonally complementary linear polarization states of the light beam I which in its unpolarized state is indicated by $I_O$.

Color A in light beam $I_p$ is reflected in beam A onto light valve 15A normal to its surface by dichroic mirror 41. Light valve 15A is optically or light image coupled to a cathode ray tube 24A in a manner which will be described below. When the CRT 24A has no phosphor emission and is therefore dark, the light valve remains in its "off-state" and the color A light indicated by the vector RA is reflected from the light valve mirror with its polarization unchanged back to the polarizing beam splitter 40 via dichroic mirror 41. Because the polarization of the light is unchanged from its original P state, the light again passes through the cube 49 and returns to the light source mirror 46. When the CRT is on, the light valve 15A is switched to its "on-state", and the polarization state of the color A reflected light indicated by the vector RA is partially or totally switched from P to S polarization state. The degree of switching depends on the intensity level of the CRT phosphor emission. Now when the reflected light, RA, returns via the dichroic mirror 41 to the polarizing beam splitter cube 49 normal to its surface, the S polarized light thus reflected from light valve 15A is reflected at the beam splitting layer 40 and is passed as a part of beam $RI_s$ to the projection lens 43 and thence to screen 44.

Colors B and C are transmitted through the dichroic mirror 41 in light beams B and C. These two latter colors are separated at the dichroic mirror 42 which reflects color B and transmits color C to their respective light valves 15B and 15C to be modulated by the light valves and the associated cathode ray tubes in the same fashion as was color A. Again, for colors B and C when the CRT phosphors are dark the polarization states will be unchanged and the light will be returned to the light source. When, however, an image signal for that color is present at the CRT, phosphor emission will activate the light valve to rotate the polarization state at spatially varying points representing the modulated image. The B and C color light which thus has its polarization state modulated to the S state will also be reflected by the beam splitter layer 40 in beam $RI_s$ and will be recombined at the beam splitter with all other colors so modulated for projection through the lens 43 onto the screen 44 to form by superposition thereon a full color image.

The single projection lens 43 forms an image of the surface or face of each of the light valves 15A, 15B, and 15C each of which is positioned at an optical path length distance from lens 43 which is equal to its back focal length since no other lens is interposed. That is to say, the optical path length from lens 43 to light valve 15A is equal to the path length from lens 43 to valve 15B which in turn is equal to the path length from lens 43 to valve 15C, each of which is equal to the back focal length of projection lens 43. The single or unitary projection lens means 43 may of course be either a single or a compound lens as required by a given system, but in any case all of its components are immediately adjacent to each other and function as a single lens means at one point in the optical path of the system. It is the path length from this point to each of the light valves which is equal along any of the three branch paths. The light remains collimated passing in both directions to and from the light valves along these paths. A primary color component image is formed at each of the light valves 15A, 15B, and 15C all of which are projected by the single projection lens 43. Since all optical elements are orthogonal or colinear and the light is well collimated throughout, registration of the images is simply a matter of registering the three cathode ray tube rasters. This can be done by simple mechanical and electronic adjustment in a manner well known in the art. In practice, the colors A, B, and C are preferably the standard television primary colors red, green and blue respectively. It will of course be understood, however, that for special purposes any desired color triad could be used. Where the standard red, green and blue primary colors are used, it is only necessary to apply the appropriate color image signal from a received television program to its respective cathode ray tube in order to activate the projection system.

Figure 7:
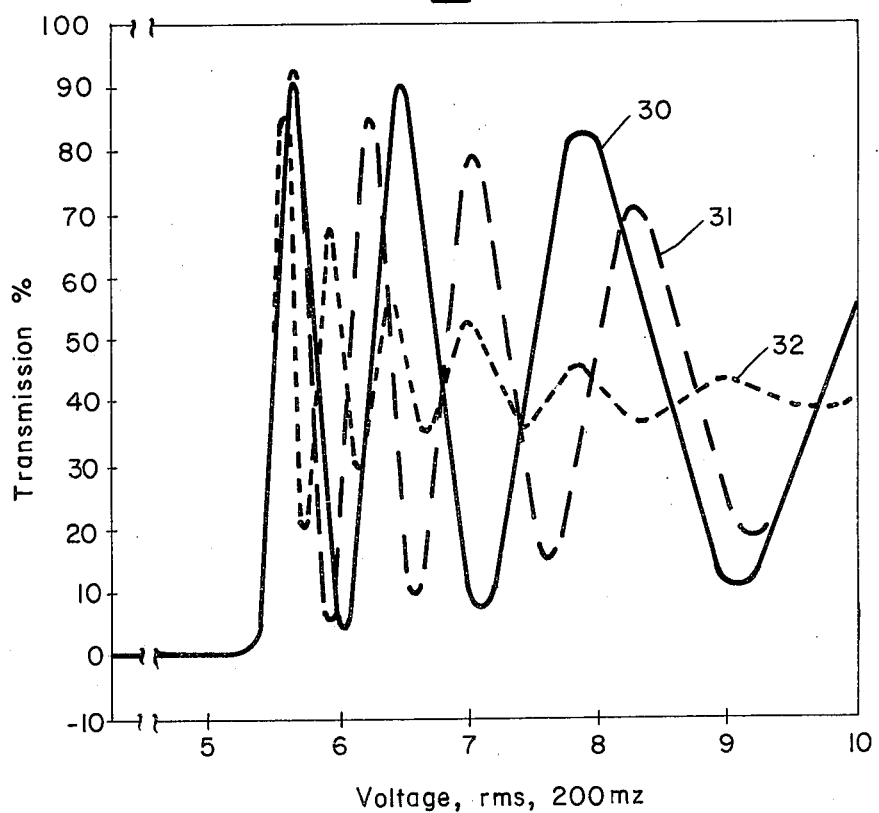
FIGS. 5, 6 and 7 are respectively reproductions of FIGS. 1, 2 and 3 in the above noted Bleha application illustrating the operation of a light valve of the type which is necessary to the operation of the present system but which does not per se form a part of the present invention.
Figure 5:
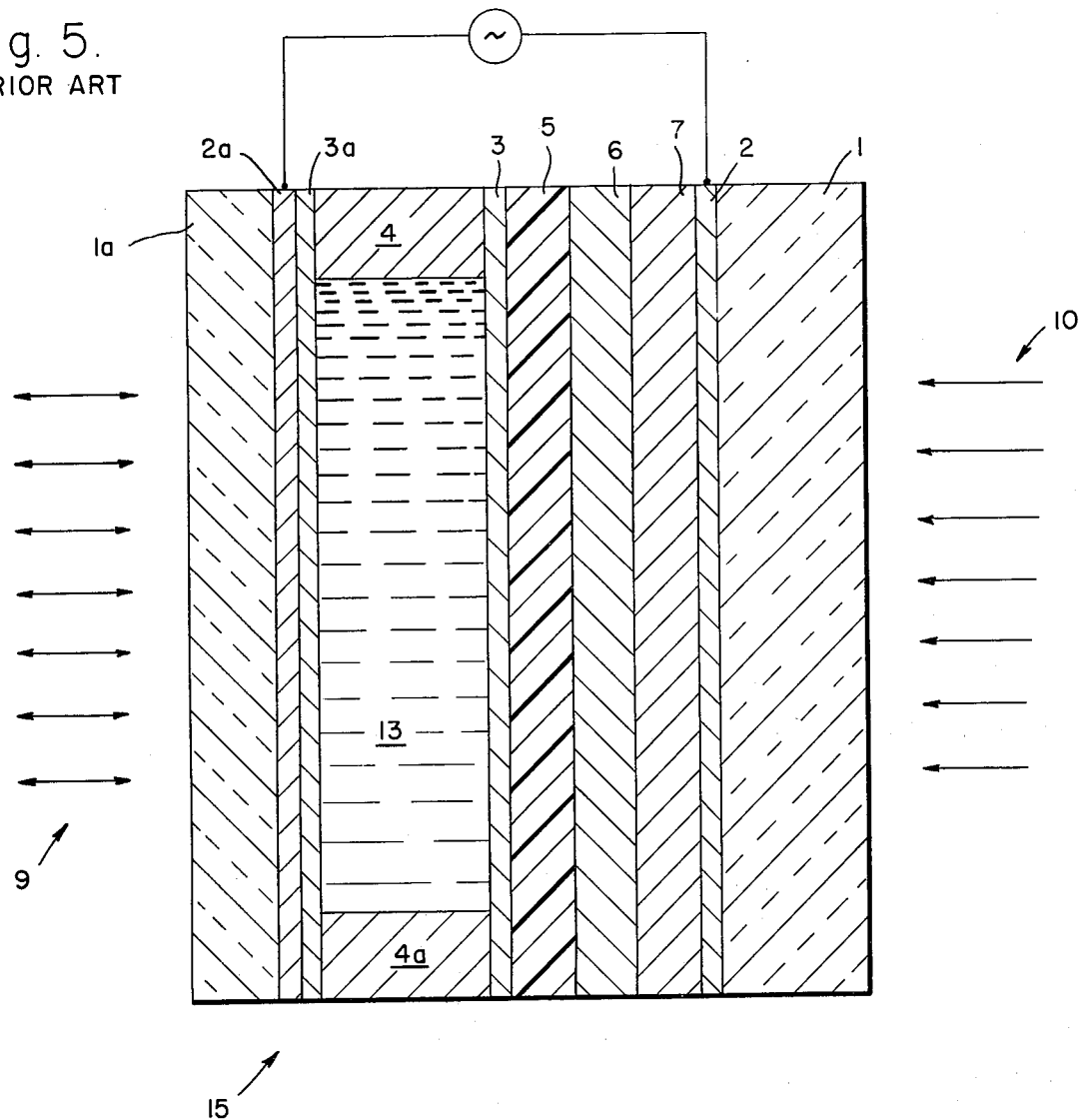
Figure 6:
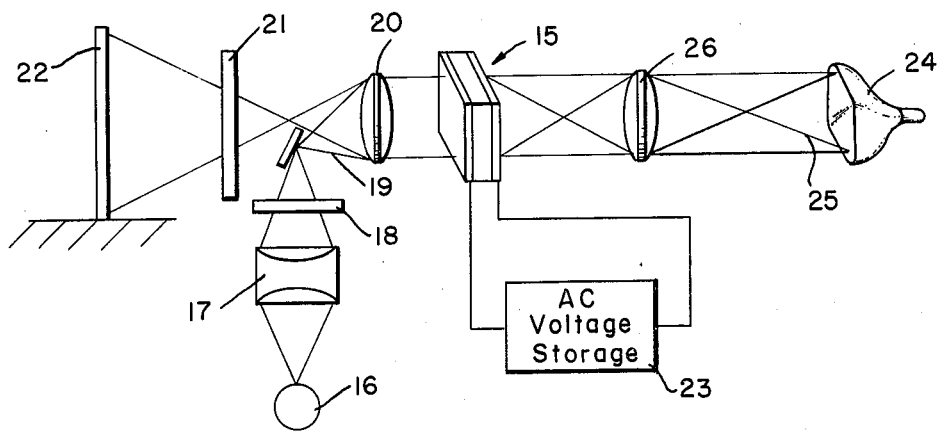

Since all of the embodiments of the present invention to be described below as well as that described above utilize three or more of the light valves 15 optically coupled either by a lens or a fiber optic array to a cathode ray tube, the detailed mode of operation of these devices as disclosed in the above noted Bleha application will be included at this point for the sake of completeness of disclosure. FIGS. 5, 6 and 7 herein are respectively reproductions of FIGS. 1, 2 and 3 of the Bleha application.

The photo-activated AC liquid crystal valve of FIG. 5 is a planar multilayered structure that can impress an AC voltage on a liquid crystal layer in direct relationship, both spatially and temporally, to the variations of intensity of an input light image 10. Since this planar device has no structurally defined resolution elements and the component thin film layers have high sheet resistance high resolution imagery is possible. For a more detailed description of AC liquid crystal light valves, including liquid crystal materials suitable for use herein, reference is made to the above cited Beard U.S. Pat. No. 3,824,002 which, in particular, stresses the necessity fo matching the AC impedance of the photoconductor with that of the liquid crystal being used.

The light valve is fabricated on a glass substrate 1 or on other optical quality substrate material that is transparent over the spectral band where the photoconductor 7 is sensitive. A fiber optic face plate can also be used for this purpose. On the substrate a thin transparent conductor 2, typically of indium tin oxide is deposited. The sheet resistance of this film is preferably 1 to $10^3$ ohms per square, with a value determined by the requirement that there be no appreciable AC voltage variation across the surface of the film when the device is operated with a particular AC frequency or a combination of frequencies. We have found thicknesses in the range from 0.01 microns to 0.20 microns to be useful. The next film deposited is a high impedance photoconductor 7 that possesses high sensitivity to a low level input image, that is to say, an image having an intensity of less than 100 microwatts per square centimeter. This photoconductor layer may be cadmium sulfide, which has a spectral response maximum in the vicinity of 520 nanometers. Other photoconductors such as zinc sulfide, selenium and zinc telluride as well as complexes of zinc and cadmium sulfide or selenium and cadmium sulfide, may also be used. A primary requirement for the choice of photoconductor is that it have a sheet resistance similar to that of the liquid crystal being used, so that high resolution imagery can be obtained without smearing the image due to current spread. Of course, it is also necessary (as is taught by the above cited Beard patent) that the photoconductor be impedance matched with the liquid crystal in the direction perpendicular to substrate 1. We have successfully constructed a particular embodiment of the light valve using cadmium sulfide with a thickness of from 2 microns to 20 microns, which results in a photoconductor dark resistivity of approximately $10^{10}$ ohm centimeters by using either thermal evaporation or a reactive sputtering technique to form this photoconductor layer.

As will become more clear hereinafter, in fast response time devices such as are required for use with television rate raster-scanned inputs, a particularly thin (on the order of 2 microns) film of liquid crystal having a thickness variation no greater than 0.25 microns is to be preferred.

The 0.25 microns thickness variation of the liquid crystal can only be maintained if the photoconductor thin film layer has minimal thickness variation. One way to achieve this is by means of mechanical polishing; however, we have noted that surface states of the cadmium sulfide caused by impurities, absorbence, and damage can exert a major influence on the dark current level sensitivity and response time of the device. Mechanical polishing does have a somewhat detrimental effect on the dark current and response time characteristics of the photoconductor; however, a mild anneal in air or in Argon tends to improve somewhat the photoelectrical characteristics of the cadmium sulfide. We have also found that chemo-mechanical polishing with a Transene-Iodine-Cabosil slurry results in a high cadmium-to-sulfur ratio left on the surface following the polishing treatment. This excess cadmium is hypothesized to create shallow donors giving an accumulated surface condition that is beneficial to photo-electrical performance of the cadmium sulfide. It has also been our experience that a graded defect concentration photocapacitive substrate structure such as that disclosed in the copending application Ser. No. 625,331, filed on Oct. 22, 1975 by Fraas and Bleha entitled "Charge Storage Diode with Graded Defect Density Photocapacitive Layer" and assigned to the same assignee as the present invention although not essential to operativeness has particularly desirable photoelectrical performance characteristics when employed in light valves used in the present invention.

In the case of a light valve to be used in a "reflective mode" display, the next layer to be formed is an opaque light blocking layer 6 that acts to prevent readout or projection light 9 from reaching the photoconductor. Cadmium telluride may be used for this layer and has the additional benefit of providing a heterojunction with photoconductor layer 7 which facilitates the required impedance match between the photoconductor and the liquid crystal. This cadmium telluride light blocking layer may be deposited by thermal evaporation or by sputter deposition and has a typical resistivity of $10^8$ ohm centimeters and a thickness ranging from 1 to 4 microns. Of course, other light blocking layer materials may be used, providing that they have a sheet resistance on the same order of magnitude as that of the liquid crystal, and at the same time have a high absorption of light over the spectral band over which the photoconductor responds. Assuming that cadmium sulfide is being used for the photoconductor and is particularly sensitive in the visible spectrum, cadmium telluride, which has a high absorption throughout the visible spectrum is particularly effective, a 2 micron thick film of cadmium telluride attenuating light in the visible spectrum by a factor of greater than 10,000. However, other materials which have a band gap in the infrared region such as indium phsophide, gallium arsenide, silicon, or a complex of zinc and cadmium telluride, could also be used for this particular application.

The next element in the device is a multilayer dielectric mirror 5 consisting of alternating quarter wave films of high and low refractive index. A dielectric mirror, as opposed to a metallic mirror, is required to insure the requisite high sheet resistance. Also, the use of a dielectric mirror (which has a typical DC resistance of greater than $10^{10}$ ohms per square centimeter) requires the use of alternating currents to operate the device, as it blocks DC voltages from falling across the liquid crystal. However, as noted in the above cited Beard patent, this is beneficial inasmuch as AC operation permits the use of chemically inert insulative material to surround the liquid crystal and protect it from any contamination or electro-chemical effects. In one typical embodiment of the light valve dielectric mirror 5 comprised alternating films of thermally deposited zinc sulfide and sodium aluminum fluoride. Sputter deposited films consisting of alternating layers of titanium dioxide and silicon dioxide also have been used.

In practicing the invention, we have successfully constructed the dielectric mirror 5 of thickness 1.54 microns by stacking two component mirrors, one having six alternating layers tuned in the blue and the other having six alternating layers tuned in the red to provide a broadband visible spectrum mirror. The average reflectivity over the visible spectrum (from 450 nm to 700 nm) of such a mirror is greater than 90% and in principle, by laying down more layers, reflectivity in excess of 99% across the visible spectrum in realizable. We have found that, in order to obtain uniform mirror optical properties when bias sputtering is the technique used for depositing the films of the mirror, a blocking plate designed so that it provides a close fit around the edge of the substrate and at a height that is level with the top surface of the substrate during the course of the bias is useful to help eliminate electric field variations. Such variations would have the undesirable effect of spatially varying the deposition rate toward the edge of the substrate.

The final layer on substrate 1 is a passivating dielectric film 3 that is inert to chemical, electrochemical or mechanical interaction with the liquid crystal being used. This film can be the final film of the dielectric mirror 5 or an additional film of sputter deposited silicon dioxide in a thickness ranging from 0.1 mircons to 0.5 microns. Obviously, other thicknesses as well as other transparent insulating films (such as aluminum oxide) could also be used. This passivating film also provides an alignment mechanism for the liquid crystal to be described in more detail hereinafter.

Also required for the liquid crystal cell is a counter electrode, consisting of a glass plate 1a (similar to the substrate 1), upon which counter electrode 2a (similar to electrode 2) is deposited. A passivating dielectric film 3a (similar to film 3) providing a suitable alignment mechanism is also required. Located between passivating films 3 and 3a is a birefringent nematic liquid crystal 13 having properties to be described in more detail hereinafter. For best operation of an AC light valve constructed in accordance with the present invention, a thin film of liquid crystal preferably having a thickness in the range $1\mu$ to $12\mu$ is required. The particular thickness may be established by spacers 4 and 4a which may be of teflon or sputtered $SiO_2$ (particularly useful when a thin layer of liquid crystal is required) or of other insulative materials such as mylar having no chemical reaction with the liquid crystal. As mentioned previously, the light valve of FIG. 5 requires precise control of the liquid crystal film layer thickness in order to insure device uniformity. In order to maintain this uniformity, we have found it sometimes advantageous to use thickness-tuning screws which can be used to adjust the liquid crystal layer thickness by a small amount. This adjustment may be made while viewing the liquid crystal layer thickness by means of an optical interferometric technique.

The above detailed description is premised on the use of a "birefringent nematic liquid crystal". Prior to describing the operation of the device and possible applications thereof, a detailed discussion of the birefringent effect will be given. Nematic liquid crystal molecules are optically anisotropic. i.e., the index of refraction along their long axis is different from that along their short axis. Moreover, the index of refraction along the short axis of the molecules is the same irrespective of the angular orientation of the molecule about its long axis. This is in accordance with the etymology of the word "nematic", which means rod-like. By convention, the index of refraction along the length of the molecules is called the extraordinary index ($n_e$) and that along the short axis is called the ordinary index ($n_o$).

The basic principle which underlies the use of optical birefringence is thus: If all the molecules are physically aligned with respect to one another, that is to say, all their long axes are parallel, and if linearly polarized light is then introduced into the material with the direction of polarization wholly along either the extraordinary axis or the ordinary axis, then no change occurs in the polarization of the light. However, if the direction of the incident linearly polarized light has a component along the extraordinary axis and a component along the ordinary axis, then the state of polarization will change from linear to elliptical (or even circular and back again) as the light progresses through the material. The extent of the change depends on several factors including the relative proportion of the original polarization along the extraordinary axis as compared to the ordinary axis. In order to make best optical use of this basic principle the incident light should be fully collimated in parallel beams.

The difference between the extraordinary index and the ordinary index of this material is termed the birefringence of the liquid crystal, $\Delta n_0$. The effective birefringence, $\Delta n$, in this system is the degree to which the longitudinal axis of the molecules tilt with respect to the linear polarization direction of the light. The extent of the change in polarization state is a function of the effective birefringence of the material and is also a function of the distance which the light travels throught the liquid crystal and a function of the wavelength, that is to say the color of the light. The formula that relates these quantities is:

$$T = K \sin^2(2\phi) \sin^2(\pi \Delta n d/\lambda)$$

where

T = the fraction of the incident light that emerges from the liquid crystal after it first passes through a polarizer that is oriented perpendicular to the direction of polarization of the incident light.

$\phi$ = the azimuthal angle between the incident polarization and the direction of the extraordinary axis of the liquid crystal.

$\Delta n$ = effective birefringence of the liquid crystal.

$d$ = thickness of the liquid crystal.

$\lambda$ = wavelength of the light.

K = constant related to the transparency of the cell.

Referring now with particularity to the device depicted in FIG. 5, it can be seen that $\phi$, the azimuthal angle between the incident polarization and the direction of the extraordinary axis of the liquid crystal is fixed by the preferred direction of liquid crystal alignment that has been caused by the alignment mechanism already built into insulator films 3 and 3a. Obviously, if a preferred direction was not built into the device, or if the incident light were not collimated, then $\phi$ would have different values at different points and therefore, the change in polarization state and, therefore, the transmission through the device would vary randomly over the aperture of the cell rather than vary as a function of the input image.

In order to understand the operation of the device of FIG. 5, it is necessary to note that $\Delta n$ changes with the change in the orientation of the liquid crystal molecules. If, the molecules are tilted so that the relative amount of the extraordinary axis that the light "sees" (as it progresses through the material) is increased, $\Delta n$ is increased in proportion, it being assumed that the amount of the ordinary axis of the liquid crystal that the light sees is held fixed. It should be noted that the amount of tilt is determined by the strength of the electric field that is induced across the liquid crystal layer 13 by action of the AC field applied across electrodes 2 and 2a and modulated by photoconductor 7.

Homeotropic (perpendicular to the cell walls) is the best "off-state" alignment configuration for the birefringent light valve of the present invention. With crossed polarizers this alignment results in a uniform dark background screen. This gives high contrast with the on-state dynamic symbols and enables the superposition or overlaying of static projected information such as maps or other formats.

It is also necessary that all of the molecules tilt in exactly the same plane; otherwise the output of the device (given by T in the above equation) will be determined not only by the changes in $\Delta n$, but also by changes in $\phi$ (as explained above). The alignment means alluded to above is therefore necessary in order that in the absence of applied electric field all the liquid crystal molecules are aligned in the same direction and that in the presence of an external field, all molecules tilt in the same plane. It should be noted that this constraint does not apply in the case of circularly polarized light.

In the absence of a defined tilt direction, the liquid crystal molecules can tilt in any direction relative to the axis of the system. When an electric field is applied, there is therefore a 360° degeneracy in the tilt direction angle. In order to remove this randomness we have found it advantageous to introduce a preferred tilt direction by preparing the substrate surfaces in contact with the liquid crystal material for both homeotropic and homogeneous (parallel to the cell walls) alignment. The competition between these two forces creates a several degree "off-state" unidirectional tilt in the direction of the homogeneous treatment. If the "off-state" tilt angle is too large, the "off-state" transmission will be high, resulting in a lower contrast ratio. On the other hand, a small tilt angle is not effective in defining a single direction of tilt. We have found an optimum valve to be somewhere between four and ten degrees from the normal.

For the required homogeneous alignment treatment we prefer shallow angle ion beam etching. As perpendicular aligning agents we have also used the liquid crystal additives Sterate and Lecithin, and also a surface treatment with Silane.

Referring now with particularity to FIG. 6, wherein a single channel optical system for use with a reflective mode light valve is illustrated, it may be seen that in addition to light valve 15 there is provided a projection light source 16 and associated condenser 17, which passes all the projection light through a polarizer 18. The light emanating from this polarizer and a 45° angle mirror 19 is linearly polarized and passes through a projection lens 20, through the liquid crystal contained in light valve 15 and onto the dielectric mirror 5, whereupon it is reflected back towards lens 20 as will be described in more detail and as is indicated by arrows 9 in FIG. 5. Only that light passing through portions of the liquid crystal that is subjected to an electric field in excess of that produced by a threshold voltage will have its polarization state substantially changed. Light whose polarization state is unchanged by light valve 15 is blocked by analyzer 21 which has its axis of polarization oriented relatively perpendicular to that of polarizer 18 to provide a black background. Light which has its polarization state changed to circular or elliptical will have a portion of its polarization oriented parallel to the axis of polarization of analyzer 21 and will therefore be passed and projected to projection screen 22. AC voltage source 23 has its characteristics determined by the characteristics of the liqiud crystal being used and typically may be anywhere in the range from 0.1 to 1000 khz at voltages in the range 5 volts to 80 volts.

Also provided in the optical system of FIG. 6 is a cathode ray tube 24 which provides a source of writing light 25, which is directed by a writing lens 26 onto the rear of light valve 15 (as shown by arrows 10 in FIG. 5) wherein it impinges on the photoconductor layer 7, thereby modulating the field across the liquid crystal 13. Other sources of input writing light are also possible. For example, the fixed image from a photo-transparency may be projected onto the rear of the light valve using an appropriate optical system, or fiber optic coupling from a cathode ray tube may be used in place of lens 26.

Referring now with particularity to FIG. 7, wherein the response characteristics of a typical birefringent liquid crystal are illustrated, it may be seen that three curves are presented which represent respectively the transmission of the light valve for each of three primary colors; red (curve 30), green (curve 31) and blue (curve 32). The different colors have different curves because the transmission factor T depends on the wavelength of the light as shown in the above equation. Thus, should a color symbology projection capability be required wherein different shades of gray are represented by different colors, it is only necessary using white projection light to apply voltage at which one color is at a maximum, while the other colors are at a minimum or, at least, are less than maximum. For example, assume the application of 6.5 volts wherein green is at a minimum. At this voltage magenta colored light (red with some blue mixed in) would be transmitted. To change colors, a change in voltage is required. For example, a change to 7.0 volts minimizes the transmission of red light and the resultant light transmitted is actually green with a little blue mixed in it. Thus, it can be seen that by changing the voltage supplied across the electric crystal, the tilt in the molecules and thus $\Delta n$ is changed and thereby one or another color may be selected from the white projection light.

It is to be noted that in the operation of the device of FIGS. 5 and 6, the control of this birefringent effect is not by alteration of the voltage applied to electrodes; rather, the field applied across the liquid crystal is modulated by changes in the photo-conductance and the photo-capacitance of photoconductor layer 7. A writing light source 10 is the input used to activate the device and the amount of light from this source that falls on a given area of the photoconductor determines how much voltage is switched from the photoconductor to the immediately adjacent liquid crystal. Hence, the amount of light that falls on a point of the photoconductor determines the color that the device transmits to the screen at the associated image point on the screen. In this way, by inputting a grey scale image of alphanumeric characters (for example) onto the photoconductor, a multicolor, (one for each grey level in the input) image can be projected onto the large screen 22 of FIG. 6. Thus, it may be seen that the device may be used to implement a high resolution photo-activated color symbology light valve useful in a large screen multi-color symbology display system.

However, the foregoing color symbology mode of operation is not the only mode possible and, indeed, is not the mode primarily used in the system of FIGS. 1–4. Referring again specifically to FIG. 7, it may be seen that in the vicinity of the threshold of the birefringent effect (approximately 5.3 volts in the diagram), all three colors transmit about equally. They do so up to the first maximum (approximately 5.7 volts). Hence, over this relatively limited voltage range the device transmits white light or any and all colored light which is incident on it. This is the operating voltage range used for light valves 15A, 15B and 15C in FIG. 1. The amount of light actually transmitted, T, is a function of the voltage and therefore of the intensity of the input light. The areas of the liquid crystal layer that have a voltage across them of less than the threshold voltage of 5.3 volts transmit unchanged linearly polarized light. The analyzer 21, will block this light and it is possible to use the device to project white and greyscale symbols or monochromatic pictures of any color projection light on black background. This is, thus, the operating mode used to form the three primary color images by the light valves 15A, 15B, and 15C respectively in FIG. 1. In this application, an extremely high sensitivity device results inasmuch as a difference of approximately 0.4 volts over and above the threshold voltage of 5.3 volts results in a change from full black to full white. In view of this small (less than 10% switching ratio, fewer photons are required to impinge on the photoconductor 7 and therefore the writing light source can be a relatively low level source such as a standard cathode ray tube. Furthermore, since the liquid crystal only serves to switch the polarization state of the projection light, whether it be white light for black and white projection as in FIG. 6 or a primary color for color projection as in FIG. 1, the black and white contrast of the present invention depends entirely on the quality of the optical system (which determines the depth of black on the screen) and extremely high contrast can be realized. Furthermore, the liquid crystal layer can still be quite thin without any corresponding change in contrast since the product $d\Delta n$ is the controlling factor. As can readily be shown, thinner layers result in greater speed and higher resolution.

The rise time of the birefringent liquid crystal layer is given by $$t_r = \frac{\gamma d^2}{\epsilon_o \epsilon_a (V^2 - V_{th}^2)} \quad (1)$$

and the decay time by $$t_d = \frac{\gamma d^2}{\pi k} \quad (2)$$

where
$\gamma$ = the liquid crystal viscosity coefficient,
$d$ = liquid crystal thickness,
$\epsilon_o$ = the permittivity of free space
$\epsilon_a$ = the liquid crystal dielectric anisotropy,
$V_{th}$ = threshold voltage for the liquid crystal,
$V$ = operating voltage applied to the cell and
$K$ = appropriate elastic constant. The threshold voltage is given by $$V_{th} = \pi \left( \frac{K}{\epsilon_o | \epsilon_a |} \right)^{\frac{1}{2}} \quad (3)$$

Assuming some switching ratio $R = V/V_{th}$ is applied to the liquid crystal by the substrate and combining (3) and (1), we find that the rise time given by $$t_r = \frac{\gamma d^2}{\pi^2 K (R^2 - 1)} \quad (4)$$

and the ratio
$t_d/t_r$ by $t_d/t_r = \pi (R^2 - 1)$

In order to make the cell faster we could change K and/or $\gamma$, but this involves the synthesis of a new liquid crystal. A more direct way is to decrease the thickness, $d$, of the cell. The response times (rise and decay) both decrease as $d^2$. Hence we prefer to use in our light valve liquid crystal thicknesses on the order of $2\mu$.

Assigning $\lambda_o$ for the wavelength of maximum transmission in the above equation, and $\Delta\lambda$ for the bandwidth at 50% transmission, it can be shown that the relative light bandwidth $\Delta\lambda/\lambda_o$ of the system is given by $$\frac{\Delta\lambda}{\lambda_o} = \frac{4(2k-1)}{(4k-1)(4k-1)} \quad k = 1, 2, 3, \ldots$$

where the parameter, $k$, picks out the particular orders of the oscillating transmission characteristic shown in FIG. 7. For $k = 1$ the bandwidth is 100%. In the table, below, we calculated some bandwidth values as a function of the transmission order. The various transmission orders are associated with increasing layer retardations $d\Delta n$. Thus $k = 1$ corresponds to the retardation $\lambda/2$; $k = 2$ to the retardation $3/2\lambda$, etc.

| $d \Delta n [\lambda_o]$ | 0.5 | 1.5 | 2.5 | 3.5 | 4.5 |
|---|---|---|---|---|---|
| k | 1 | 2 | 3 | 4 | 5 |
| $\Delta\lambda/\gamma_o [\%]$ | 100 | 20 | 11.1 | 7.7 | 5.9 |

For small retardation, up to the first transmission peak ($d \Delta n = 0.5\lambda_o$) the bandwidth is very large and the entire visible spectrum is transmitted to produce a white on black image. There is dramatic change in the bandwidth when the retardation corresponding to the second transmission peak occurs ($d \Delta n) = 1.5\lambda_o$) thus some color separation appears. The black and white TV cell operates in the region $0 < (d \Delta n) < 0.5\lambda_o$. In this range we observe very high contrast 80:1, primarily limited by the optical system, 6 shades of gray, 5–100 $\mu W/cm^2$ sensitivity, combined rise and fall times in the range of 100–150 ms. These performance figures make the device of FIGS. 5 and 6 applicable to the projection of black and white television images or to the projection of color symbology images. When operated in systems of the type shown in FIGS. 1, 2, 3, and 4 using at least three light valves each modulating a different primary color, the device of FIG. 5 is suitable for the projection of a full color television image.

The light valves 15A, 15B, and 15C shown in FIGS. 1–4 are of the same type as the light valve 15 shown in FIG. 5, the change in reference character merely indicating the color of the light incident on each respective light valve. The light valves are shown in FIGS. 1–4 mounted directly adjacent to the cathode ray tube since the lens 26 shown in FIG. 6 is preferably replaced by a fiber optic coupling matrix.

Figure 2:
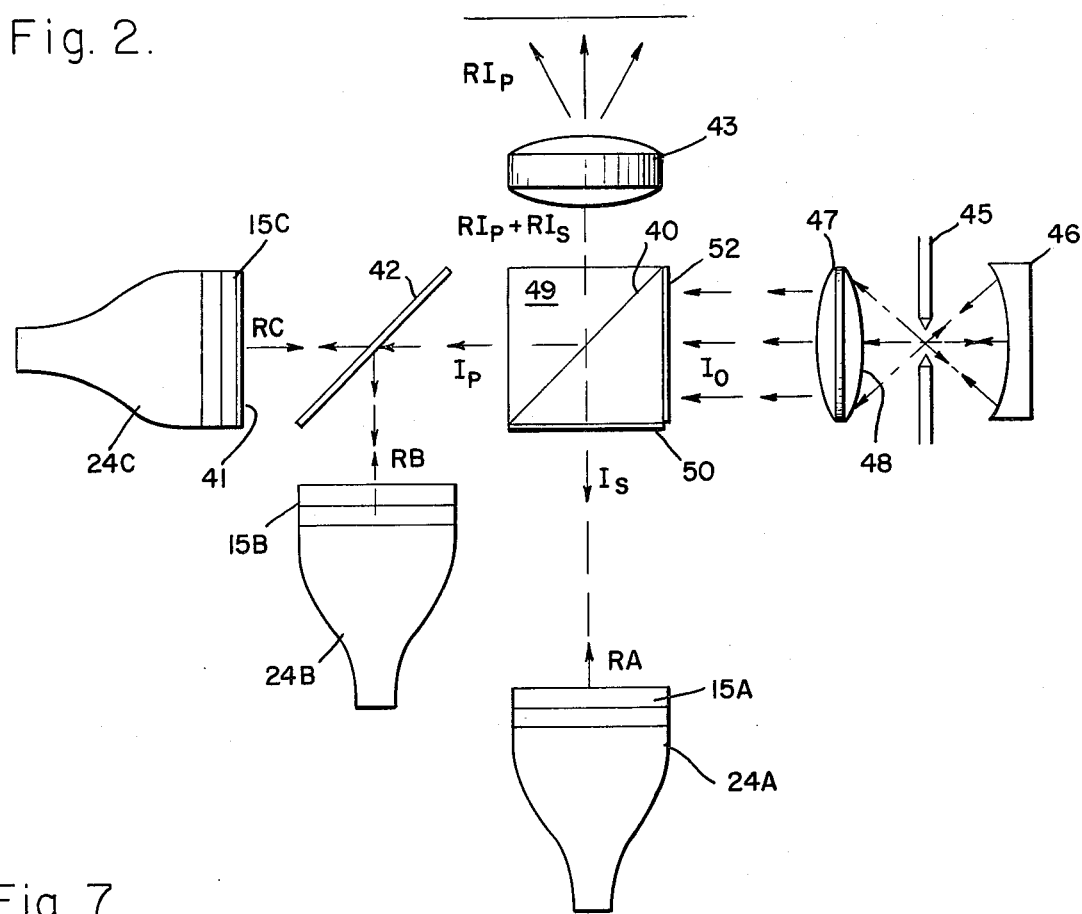
FIG. 2 is a view similar to FIG. 1 showing a second embodiment of the system.

The system shown in FIG. 2 differs from that in FIG. 1 in that all three light valves in FIG. 1 utilize the P polarization type light which is transmitted along the first optic axis 48. In FIG. 2 both the P polarization and the S polarization type light which is reflected from beam splitter 40 along optic axis 51 are used by moving the light valve 15A onto the optic axis 51 which intersects optic axis 48 orthogonally substantially at the center of the glass cube 49. In this arrangement it is necessary to use a third dichroic 50 which is positioned on the optic axis 51 between glass cube 49 and light valve 15A. Dichroic 50 transmits the A color and reflects the B and C color. The relative positions of dichroics 41 and 42 are also necessarily interchanged as seen in FIG. 2. Dichroic 42 reflects the B color to light valve 15B and transmits the A and C color. Dichroic 41 transmits the C color to light valve 15C and reflects the A color. A retardation plate 52 such as a quarter waveplate may optionally be used in this embodiment as will be described below.

The purpose of the modified arrangement shown in FIG. 2 is to use both polarization states the achieve the shortest possible back-focus for the projection lens 43. It will be noted that the three light valves and dichroic mirrors are arranged in such a fashion that the light valve for color A uses S polarization and the light valves for colors B and C use P polarization. The distance along the optical paths from projection lens 43 along optic axes 51 and 48 to the light valves is thus minimized. This makes possible the use of the shortest back-focus for the projection lens. This is especially important for home type projectors.

The polymerization phase shifter or retardation plate 52 may be added for the purpose of retrieving the unused polarization on the first pass through the beam splitter. This technique makes the light use of this system theoretically 100% efficient. Thus, the unpolarized collimated projection beam $I_0$ passes through the quarter wave phase plate essentially unchanged on the first pass. The polarizing beam splitter film 40 then separates the S and P polarizations to be directed to the appropriate dichroic mirror. The transmitted color passes on to the light valve mirror. The modulated or switched portions of this light goes to the screen and is unaffected by the phase plate 52. All of the color reflected at any of the dichroic mirrors, however, is reflected back to the light source and must pass through the quarter waveplate 52. It then goes to the source mirror 46 and returns back through the quarter waveplate 52. This double pass through the retardation plate results in a rotation of polarization of this light by approximately 90° (depending on wavelength) such that it has a component now available in the orthogonal polarization which will pass to the appropriate light valve to be modulated. For example, in FIG. 2 the incident beam of S polarization, $I_s$ is reflected at the beam splitter film 40 and passes to the dichroic mirror 50. Color A is transmitted and modulated by light valve 15A. Colors B and C are reflected at dichroic mirror 50, beam splitter film 40 and back through the quarter waveplate where the S polarization becomes circularly or elliptically polarized depending upon wavelength. This beam is then reflected by the source mirror 46 back through the quarter wave plate 52 where it emerges as linear P polarization or elliptical polarization with major axis of P polarization depending on wavelength. This beam of colors B and C with P polarization passes through the beam splitter film and is modulated by the light valves 15B and 15C. The portion of this beam with S polarization (in the case of elliptical polarization due to wavelength) is reflected again at beam splitter 40 to dichroic mirror 50 for another pass through the phase plate. In theory, all of the light beam power of colors B and C will be rotated 90° given enough passes. The practical quantity is determined by the alignment of surfaces and mirrors and the degree of collimation of the beams.

Figure 3:
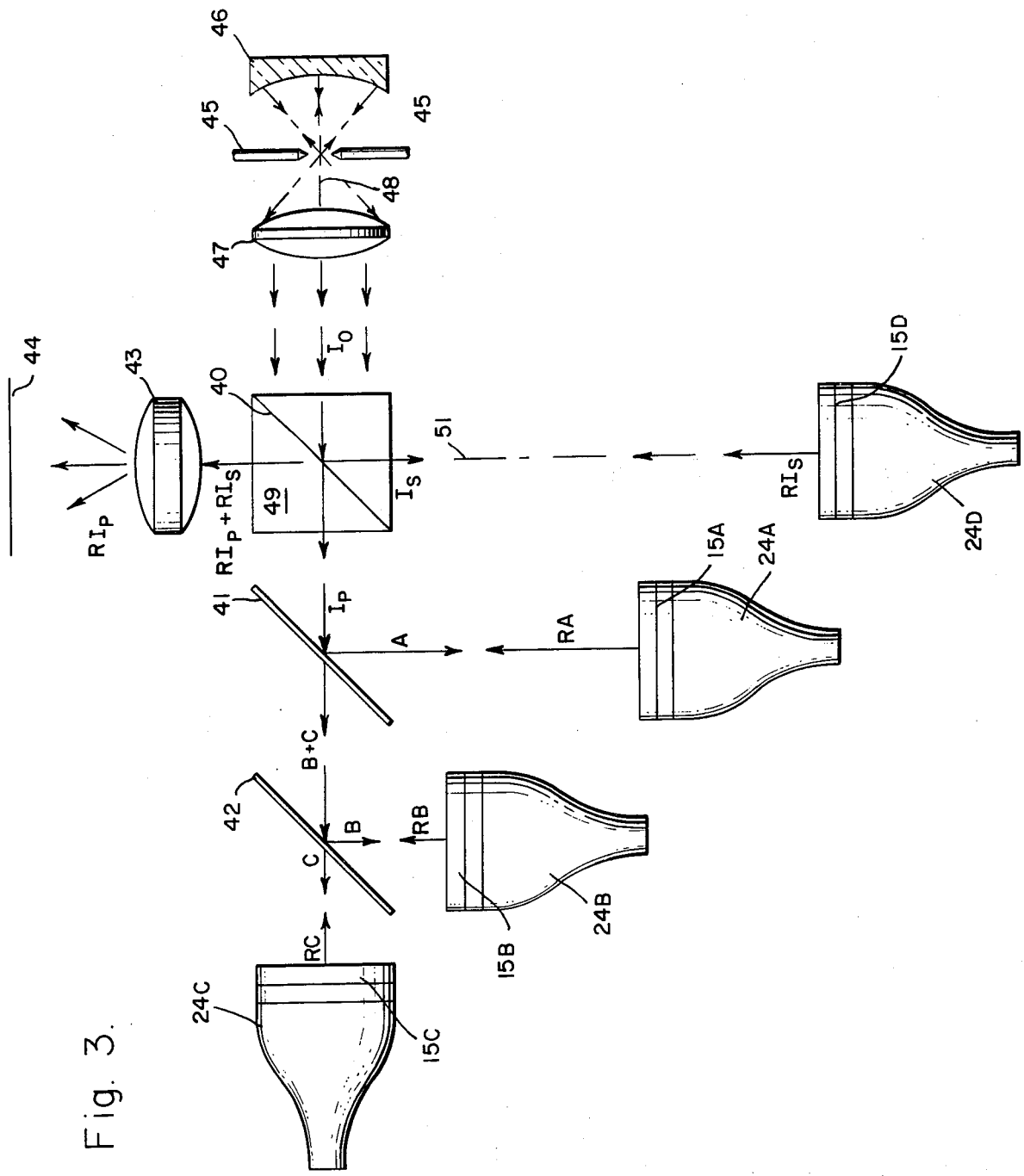
FIG. 3 is a view similar to FIG. 1 showing a third embodiment in which provision for monochromatic overlay information has been added to the system of FIG. 1.

In FIG. 3 there is shown a system providing for full color projection with black and white or color symbology overlay. The system comprises four light valves, three of which, 15A, 15B and 15C, are arranged and operate in the same fashion as described in connection with FIG. 1. A fourth light valve, 15D, is positioned on the optic axis 51 which extends through the beam splitting polarizer 40 and the projection lens 43. Light valve 15D may be used to introduce monochromatic overlay information such as grids, legends, or the like either in black and white or in any color symbology format as discussed above in connection with FIGS. 5 and 6. Similarly, monochromatic static imagery may be overlaid on the picture produced by light valves 15A, 15B and 15C if it is supplied through light valve 15D.

Figure 4:
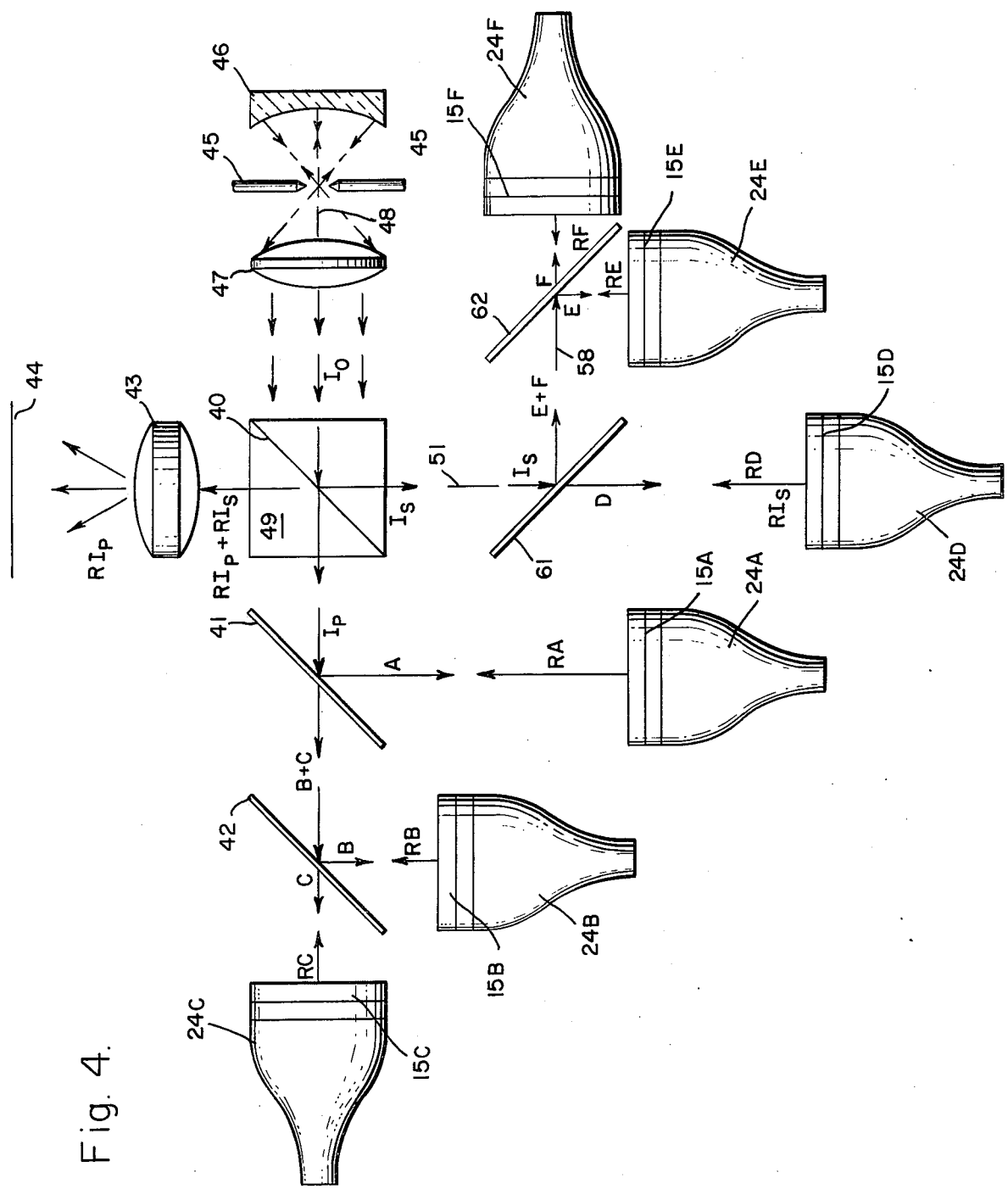
FIG. 4 is a view similar to FIG. 1 of a fourth embodiment of the system in which provision is made for complete use of all of the projection light either in standard full color operation or in three dimensional stereoscopic full color operation.

In FIG. 4 there is shown a six light valve system for full color projection which uses both S and P polarization states without reliance on the polarization phase shifter or multiple passes. It is theroretically 100% efficient and, furthermore, it has a very high practical efficiency. The system may be used purely as a means of obtaining this efficiency in normal color projection, or it may be operated in a manner such as to provide three-dimensional stereoscopic viewing. When operated in the stereoscopic mode two cameras generate respectively left eye and right eye color picture signals which are transmitted, detected, and applied to the appropriate CRT's 24. The color information for the red, green and blue components of the left eye camera is supplied to cathode ray tubes 24A, 24B and 24C respectively while the red, green and blue components for the right eye picture information are supplied respectively to cathode ray tubes 24D, 24E, and 24F. All light reaching the screen from the left eye tubes will be of P polarization and all light reaching the screen from the right eye tubes will be of S polarization. The view may then observe the screen through eyeglasses with linear polarizer lenses. The left lens must have its E vector vertical for passing P polarization and blocking S polarization whereas the right lens must have its E vector horizontal for passing S polarization and blocking P polarization. When the appropriate tubes as described above are addressed with correct stereoscopic information the result on the viewers perception while looking through such lenses is the so-called three-dimensional or stereoscopic effect. In the absence of such lenses, or if both sets of tubes are addressed with the same color picture information, the system is simply a more efficient means of projecting a standard full color image.

As may be seen from a comparison of the six light valve system of FIG. 4 with the three light valve system of FIG. 1, the six valve system includes all of the components of the three valve system of FIG. 1 which are utilized for the left eye information in the stereoscopic mode. Additionally, the system of FIG. 4 includes the light valves 15D, 15E, and 15F which are respectively associated with the cathode ray tubes 24D, 24E and 24F. Tube 24D and valve 15D are positioned on the optic axis 51 passing through the projection lens along which the S polarization state light is reflected from the beam splitter 40. On this same axis is a dichroic mirror 61 which transmits the D color and reflects the E and F colors along an axis 58 which is orthogonal to axis 51 and parallel to axis 48. A second dichroic 62 transmits the F color S polarization light to the light valve 15F which is also positioned on this optic axis 58. Dichroic 62 reflects the E color light to light valve 15E. Of course, it will be noted that all dichroics are positioned at 45° angles to the optic axes on which they are positioned so that an orthogonal relationship between the various light valves and other optical components of the systems is maintained for ease of alignment and image registration.

It is thus seen that there has been provided an optical system for real time projection of very high brightness, full color pictorial television images onto a display screen from a set of three or more field effect mode liquid crystal light valves. Moreover, the optical system is such that none of the optical elements absorb any significant amount of light in carrying out their function. The optical elements all work on the basis of multiple layer dielectric coatings which work on the principle of optical interference. The light valve modulates the polarization of the projection light rather than its intensity. Therefore the optical system is such that none of the optical elements absorb any significant amount of light. That is, they are non-absorptive to first order. Normal cooling equipment commonly used with motion picture projection apparatus which is already in place is therefore adequate to cool a system which still has light power enough to provide brilliant images of high image contrast and high resolution. The apparatus is simple, compact, and low in weight while yet providing high brightness, full color projection through a single projection lens. The system may be provided with legend overlay capabilities or with three-dimensional stereoscopic capabilities for projection of full color, real time, dynamic or static imagery.

What is claimed is:

1. In an electro-optical system for projecting in real time very high brightness, full color images from television or other program sources onto a display screen, said system being of the type which additively synthesizes said images by superposition of at least three different primary images and which uses only projection beam optical processes which are non-absorptive to first order in order to avoid overheating the system, the improvement comprising:
    (a) light source means for providing a collimated beam of white projection light;
    (b) a single polarizer-analyzer beam splitter-recombiner multirefractive layer means positioned to receive said collimated projection light for polarizing and splitting it on a first pass therethrough and for analyzing it on a second pass therethrough for all three of said primary color images;
    (c) single projection lens means for projecting said full color image to said display screen;
    (d) dichroic mirror means for first separating collimated unmodulated polarized white light leaving said multirefractive layer means into three beams of collimated polarized light of different primary colors to be polarization state modulated and reflected, said dichroic mirror means then passing the three reflected modulated primary color collimated beams back to said multirefractive layer means for analyzing and recombining said three primary color beams to pass a resultant collimated full color image modulated beam from said single multirefractive layer beam splitter-recombiner means to said single projection lens means for forming said full color image; and
    (e) first, second and third reflection type polarization state modulation means for spatially modulating a primary color component video image in real time onto each of said first, second and third collimated beams of polarized light of first, second and third primary colors respectively received from said dichroic mirror means by modulation of the state of polarization of the light in said respective beams and for reflecting said three beams back to said multirefractive layer means to be polarization analyzed and recombined into said full color image for projection by said single projection lens means, the optical path length from said projection lens means along any of said three primary color beams to the reflection and modulation means for modulating said beam being equal to said path length along any other of said beams and said reflection and modulation means being positioned so that said projection lens means simultaneously images and superimposes the three primary color component images formed separately at each of said three reflection and modulation means in said respective collimated light beams to form said full color image without the interposition of any other lens means in the optical path between said projection lens means and said reflection and modulation means.

2. A system as in claim 1 wherein said light source means comprises an arc discharge lamp positioned between a collimating lens and a collimating mirror, said mirror, said lamp and said collimating lens being positioned in sequence on a first optic axis on a first side of said multirefractive layer means to direct said collimated projection light onto said multirefractive layer polarizing beam splitter means.

3. A system as in claim 2 wherein said projection lens means comprises a single projection lens and wherein said collimating lens in said light source and said single projection lens are the only lenses in said system.

4. A system as in claim 1 wherein said projection lens means comprises a single projection lens.

5. A system as in claim 1 wherein:
   (a) said light source means and said multirefractive layer means are positioned on a first optic axis the direction of which is defined by the beam direction of a first polarization state component of said collimated projection light beam which on said first pass is transmitted through said multirefractive layer means; and
   (b) said single projection lens means is positioned on a second optic axis for projecting said full color image along said second optic axis to said display screen, said second optic axis intersecting said first optic axis at said multirefractive layer means, said second optic axis extending in a direction defined by the beam direction of a second polarization state component of said collimated projection light beam which on said first pass is reflected by said multirefractive layer means and which polarization state is complementary to the polarization state of said transmitted beam.

6. A system as in claim 5 wherein said first, second and third reflection and modulation means each comprises a reflection type A.C. field effect mode liquid crystal light valve means, said system further including means for optically coupling each of said first, second and third liquid crystal light valve means to a cathode ray tube for deriving therefrom said video image which is modulated onto said beam of polarized light by said light valve.

7. A system as in claim 5 wherein said first and second optic axes intersect orthogonally at substantially the center of said multirefractive layer means, each making an angle of 45° with said multirefractive layer means.

8. A system as in claim 1 wherein said first, second and third reflection and modulation means each comprises a reflection type A.C. field effect mode liquid crystal light valve means.

9. A system as in claim 8 and further including means for optically coupling each of said first, second and third liquid crystal light valve means to a cathode ray tube for deriving therefrom said video image which is modulated onto said beam of polarized light by said light valve.

10. In an electro-optical system for projecting in real time very high brightness, full color images from television or other program sources onto a display screen, said system being of the type which additively synthesizes said images by superposition of at least three different primary images and which uses only projection beam optical processes which are non-absorptive to first order in order to avoid overheating the system, the improvement comprising:
   (a) light source means for providing a collimated beam of white projection light;
   (b) a single polarizer-analyzer beam splitter-recombiner multirefractive layer means positioned to receive said collimated projection light for polarizing and splitting it on a first pass therethrough and for analyzing it on a second pass therethrough for all three of said primary color images; said light source means and said multirefractive layer means being positioned on a first optic axis the direction of which is defined by the beam direction of a first polarization state component of said collimated projection light beam which on said first pass is transmitted through said multirefractive layer means; said light source means being positioned on said first optic axis on a first side of said multirefractive layer means to transmit a beam of unpolarized light along said first optic axis, said multirefractive layer means making an angle 45° with said first optic axis and transmitting a beam of white polarized light of "P" polarization state along said first optic axis and reflecting a beam of white polarized light of "S" polarization state complementary to said "P" state along said second optic axis;
   (c) single projection lens means for projecting said full color image to said display screen; said single projection lens means being positioned on a second optic axis for projecting said full color image along said second optic axis to said display screen, said second optic axis intersecting said first optic axis at said multirefractive layer means, said second optic axis extending in a direction defined by the beam direction of a second polarization state component of said collimated projection light beam which on said first pass is reflected by said multirefractive layer means and which polarization state is complementary to the polarization state of said transmitted beam;
   (d) dichroic mirror means for first separating collimated unmodulated polarized white light leaving said multirefractive layer means into three beams of collimated polarized light of different primary colors to be polarization state modulated and reflected, said dichroic mirror means then passing the three reflected modulated primary color collimated beams back to said multirefractive layer means for analyzing and recombining said three primary color beams to pass a resultant collimated full color image modulated beam from said single multirefractive layer beam splitter-recombiner means to said single projection lens means for forming said full color image; said dichroic mirror means comprising first and second dichroic mirrors positioned on said first optic axis at an angle of 45° thereto on the second side of said multirefractive means opposite the first side, said first dichroic mirror reflecting light of a first of said primary colors and transmitting light of a second and third of said primary colors to said second dichroic mirror, said second dichroic mirror reflecting light of a second of said primary colors and transmitting light of a third of said primary colors;
   (e) first, second and third reflection type polarization state modulation means for spatially modulating a primary color component video image in real time onto each of said first, second and third collimated beams of polarized light of first, second and third primary colors respectively received from said dichroic mirror means by modulation of the state of polarization of the light in said respective means and for reflecting said three beams back to said multirefractive layer means to be polarization analyzed and recombined into said full color image for projection by said single projection lens means; said first, second and third reflection and modulation means each comprising a reflection type A.C. field effect mode liquid crystal light valve means, said system further including means for optically coupling each of said first, second and third liquid crystal light valve means to a cathode ray tube for deriving therefrom said video image which is modulated onto said beam of polarized light by said light valve; said first and second liquid crystal light valve means being positioned on optic axes parallel to said second optic axis to receive and reflect light of said first and second primary colors respectively and said third liquid crystal light valve means being positioned on said first optic axis to receive and reflect light of said third primary color; and, (f) the optical path length from said projection lens means along any of said three primary colored beams to the reflection and modulation means for modulating said beam being equal to said path length along any other of said beams and said reflection and modulation means being positioned so that said projection lens means simultaneously images and superposes the three primary colored component images formed separately at each of said three reflection and modulation means in said respective collimated light beams to form said full color image without the interposition of any other lens means in the optical path between said projection lens means and said reflection and modulation means.

11. A system as in claim 10 and further including a fourth liquid crystal light valve means positioned orthogonally to said second optic axis to receive said polarized light of "S" state reflected from said multirefractive layer means to modulate said light with overlay information to be superimposed on the full color image produced by said first, second and third liquid crystal light valve means.

12. A system as in claim 10 and further including
(a) third and fourth dichroic mirror means, said third dichroic mirror means being positioned at an angle of 45° to said second optic axis to receive the "S" polarization state light reflected from said multireflective layer means and said fourth dichroic means being positioned parallel to said third dichroic means on a third optic axis parallel to said first optic axis and intersecting said second optic axis substantially at the center of said third dichroic mirror means; said third dichroic mirror means transmitting said first primary color light and reflecting light of said second and third primary colors, said fourth dichroic mirror means reflecting light of said second primary color and transmitting light of said third primary color; and
(d) fourth, fifth and sixth liquid crystal light valve means respectively positioned to receive said first primary color light transmitted by said third dichroic mirror, said second primary color light reflected by said fourth dichroic mirror, and said third primary color light transmitted by said fourth dichroic mirror means.

13. A system as in claim 12 wherein video information representing a left eye view of a given image is modulated onto said primary color light beams by said first, second and third liquid crystal light valve means and corresponding video information representing a right eye view is modulated onto said primary color light beams by said fourth, fifth and sixth liquid crystal light valve means, said system thereby projecting onto said screen an image containing stereoscopic three dimensional information which may be viewed as such through lenses for the left and right eyes having respectively orthogonal polarization directions.

14. In an electro-optical system for projecting in real time very high brightness, full color images from television or other program sources onto a display screen, said system being of the type which additively synthesizes said images by superposition of at least three different primary images and which uses only projection beam optical processes which are non-absorptive to first order in order to avoid overheating the system, the improvement comprising:
(a) light source means for providing a collimated beam of light projection light;
(b) a single polarizer-analyzer beam splitter recombiner multirefractive means positioned to receive said collimated projection light for polarizing and splitting it on a first pass therethrough and for analyzing it on a first pass therethrough for all three of said primary color images; said light source means and said multirefractive layer means being positioned on a first optic axis the direction of which is defined by the beam direction of a first polarization state component of said collimated projection light beam which on said first pass is transmitted through said multirefractive layer means; said light source means being positioned on said first optic axis on a first side of said multirefractive layer means to transmit a beam of unpolarized light along said first optic axis, said multirefractive layer means making an angle of 45° with said first optic axis and transmitting a beam of white polarized light of "P" polarization state along said first optic axis and reflecting a beam of white polarized light of "S" polarization state complementary to said "P" state along said second optic axis;
(c) single projection lens means for projecting said full color image to said display screen; said single projections lens means being positioned on a second optic axis for projecting said full color image along said second optic axis to said display screen, said second optic axis intersecting said first optic axis at said multirefractive layer means, the second optic axis extending in a direction defined by the beam direction of a second polarization state component of said collimated projection light beam which on said first pass is reflected by said multirefractive layer means and which polarization state is complementary to the polarization state of said transmitted beam;
(d) dichroic mirror means for first separating collimated unmodulated polarized white light leaving said multirefractive layer means into three beams of collimated polarized light of different primary colors to be polarization state modulated and reflected, said dichroic mirror means then passing the three reflected modulated primary color collimated beams back to said multirefractive layer means for analyzing and recombining said three primary color beams to pass a resulting collimated full color image modulated beam from said single multirefractive layer beam splitter recombiner means to said single projection lens means for forming said full color image; said dichroic mirror means comprising first dichroic mirror means positioned on said second optic axis orthogonally thereto to receive "S" polarization light and second and third dichroic means positioned on said first optic axis to receive "P" polarization state light transmitted by said multirefractive layer means, said second dichroic mirror means making an angle of 45° with said first optic axis and said third dichroic mirror means being orthogonal with said first optic axis, said first dichroic mirror means transmitting light of said first primary color and reflecting light of said second and third primary color, said second dichroic mirror means reflecting light of said second primary color and transmitting light of said first and third primary colors to said third dichroic mirror means, said third dichroic mirror means transmitting light of said third primary color and reflecting light of said first and second primary colors;

(e) first, second and third reflection polarization state modulation means for spatially modulating the primary color component video image in real time onto each of said first, second and third collimated beams of polarized light of first, second and third primary colors respectively received from said dichroic mirror means by modulation of the state of polarization of the light in said respective beam and for reflecting said three beams back to said multirefractive layer means to be polarization analyzed and recombined into said full color image for projection by said single projection lens means; said first, second and third reflection modulation means each comprising a reflection type A.C. field effect mode liquid crystal light means, said system further including means for optically coupling each of said first, second and third liquid crystal light valve means to a cathode ray tube for deriving therefrom said video image which is modulated onto said beam of polarized light by said light valve; and, (f) said first, second and third liquid crystal light valve means being respectively positioned to receive said light of said first primary color transmitted along said second optic axis by said first dichroic mirror means, to receive light of said second primary color reflected from said second dichroic mirror means along said first optic axis, and to receive light of said third primary color transmitted by said third dichroic mirror means on said first optic axis; the optical path length from said projection lens means along any of said three primary color beams to the reflection and modulation means for modulating said beam being equal to said path length along any other of said beams and said reflection and modulation means being positioned so that said projection lens means simultaneously images and superposes the three primary color component images formed separately at each of said three reflection and modulation means in said respective collimated light beams to form said full color image without the interposition of any other lens means in the optical path between said projection lens means and said reflection and modulation means.

15. A system as in claim 14 and further including a quarter waveplate positioned orthogonally to said first optic axis between said light source means and said multirefractive layer means.

* * * * *